United States Patent
Goodman et al.

(10) Patent No.: US 7,472,966 B2
(45) Date of Patent: Jan. 6, 2009

(54) WHEEL COVER ASSEMBLY HAVING STATIONARY DISPLAY AND BASE MEMBER FOR MOUNTING TO A WHEEL

(75) Inventors: Jeffrey Goodman, Roswell, GA (US); Mark J. Sampson, Atlanta, GA (US); Anthony J. DoVale, Jr., Roswell, GA (US)

(73) Assignee: Static Media Group, LLC, Roswell, GA (US)

( * ) Notice: Subject to any disclaimer, the term of this patent is extended or adjusted under 35 U.S.C. 154(b) by 151 days.

(21) Appl. No.: 11/231,560

(22) Filed: Sep. 21, 2005

(65) Prior Publication Data

US 2006/0192422 A1 Aug. 31, 2006

Related U.S. Application Data

(60) Provisional application No. 60/656,290, filed on Feb. 25, 2005.

(51) Int. Cl.
*B60B 7/20* (2006.01)

(52) U.S. Cl. ............... 301/37.25; 301/37.31; 301/37.34

(58) Field of Classification Search ............ 301/37.102, 301/37.25, 37.31, 37.34, 37.35, 37.36, 37.109, 301/37.101; 40/587

See application file for complete search history.

(56) References Cited

U.S. PATENT DOCUMENTS

| | | | | |
|---|---|---|---|---|
| 2,146,980 A | | 2/1939 | Parks | 40/129 |
| 3,795,997 A | | 3/1974 | Walton et al. | 40/129 |
| 4,280,293 A | | 7/1981 | Kovalenko et al. | 40/587 |
| 4,678,239 A | * | 7/1987 | Matsushita | 301/37.25 |
| 4,981,329 A | | 1/1991 | Koch et al. | 301/37 |
| 5,016,944 A | | 5/1991 | Schultz | 301/37 |
| 5,588,715 A | | 12/1996 | Harlen | 301/37.25 |
| 5,659,989 A | | 8/1997 | Hsiao et al. | 40/587 |
| 5,957,542 A | | 9/1999 | Boothe et al. | 301/37.25 |
| 6,045,195 A | | 4/2000 | Okamoto | 301/37.1 |
| 6,059,376 A | * | 5/2000 | Shryock | 301/37.109 |

(Continued)

FOREIGN PATENT DOCUMENTS

EP 0430348 A1 * 6/1991 ............... 301/37.36

(Continued)

OTHER PUBLICATIONS

U.S. Appl. No. 11/437,764; Office Action Dated Sep. 6, 2007.

(Continued)

*Primary Examiner*—Russell D Stormer
(74) *Attorney, Agent, or Firm*—Ballard Spahr Andrews & Ingersoll, LLP (57) ABSTRACT

The present invention relates to a selectively attachable wheel cover for a motor vehicle. The invention comprises a base member, a shaft member, and a display member. The base member is secured to the rim of a motor vehicle. The shaft member is connected to an outer portion of the base member, extending substantially transverse from the rim and substantially co-linearly with the longitudinal axis of the axle. The display member is connected to the shaft member such that it can rotate in relation to the base member and, thus, the rim. A portion of the display member is sufficiently weighted such that, when the rim rotates (when the vehicle is in motion) the display member remains substantially static.

2 Claims, 9 Drawing Sheets

U.S. PATENT DOCUMENTS

| | | | |
|---|---|---|---|
| 6,120,104 A | 9/2000 | Okamoto et al. | 301/37.25 |
| 6,443,529 B1 | 9/2002 | Williams | 301/37.25 |
| 6,471,302 B1 | 10/2002 | Romijn | 301/37.25 |
| 6,536,848 B1 | 3/2003 | Goodman | 301/37.25 |
| 6,568,110 B2 | 5/2003 | Lee et al. | 40/587 |
| 6,848,751 B1 | 2/2005 | Yuan | 301/37.25 |
| 6,857,709 B1 | 2/2005 | McLean et al. | 301/37.25 |
| 6,896,334 B1 | 5/2005 | Baker | 301/37.25 |
| 7,344,198 B1 * | 3/2008 | Dohm | 301/37.25 |
| 2002/0033634 A1 | 3/2002 | Ervin | 301/37.25 |
| 2002/0125761 A1 | 9/2002 | Matushita | 301/37.25 |
| 2004/0232759 A1 | 11/2004 | Ryu | |
| 2005/0035651 A1 * | 2/2005 | Hsiao | 301/37.25 |
| 2005/0062336 A1 | 3/2005 | Rutterman | 301/37.371 |
| 2005/0062339 A1 | 3/2005 | Fitzgerald | 301/108.1 |
| 2006/0255652 A1 * | 11/2006 | Kaufman et al. | 301/37.25 |
| 2007/0200421 A1 * | 8/2007 | DoVale et al. | 301/37.25 |

OTHER PUBLICATIONS

U.S. Appl. No. 11/409,802; Office Action Dated Sep. 6, 2007.
U.S. Appl. No. 11/467,008; Office Action Dated Sep. 6, 2007.
U.S. Appl. No. 11/446,837; Office Action Dated Sep. 6, 2007.

* cited by examiner

WHEEL COVER ASSEMBLY HAVING STATIONARY DISPLAY AND BASE MEMBER FOR MOUNTING TO A WHEEL

This application claims priority to and the benefit of U.S. Patent Application No. 60/656,290 entitled "Hub Cap Cover," filed on Feb. 25, 2005, which is incorporated in its entirety in this document by reference.

FIELD OF THE INVENTION

The present invention pertains to a cover for a rim of a motor vehicle. In particular, it pertains to a selectively attachable cover for a rim of a motor vehicle which may contain an image that remains substantially stable when the vehicle is in motion.

BACKGROUND OF THE INVENTION

In the automotive industry, consumers are constantly demanding new and innovative aftermarket products to enhance the aesthetic appearance of their vehicle. Over the past few years, the industry has witnessed vehicles being lowered to create what are known as "low riders." There have been vehicles with neon lights installed on the undercarriage, as well as hub caps and rims that remain spinning after the vehicle comes to a resting position.

In the advertising industry, motor vehicles have been a target for inexpensive advertising for years. People use decals on their vehicles to promote products, sports teams, and businesses. Additionally, other forms of advertising are common, such as magnetic signs, banners or flags that attach to a vehicles' window, or simply a bumper sticker.

Some luxury vehicles even have center hubs for their rims that do not rotate even when the vehicle is in motion. Some aftermarket hub caps have been designed to have images on their outer surface that remain substantially still when the vehicle is in motion. However, these designs have historically been cumbersome to install and are meant to be permanently installed. Some end users, such as sports enthusiasts, are reluctant to use such designs because they only want their vehicle to be advertising their teams' logos on specific days (i.e., game days).

Therefore, what is needed is a hub cap or wheel cover that is easily and selectively removable and having an outer surface available to display images which do not rotate when the vehicle is in motion.

DETAILED DESCRIPTION OF THE DRAWINGS

The accompanying drawings, which are incorporated in and constitute a part of this specification, illustrate several aspects of the invention and together with the description, serve to explain the principles of the invention.

DETAILED DESCRIPTION OF THE INVENTION

The present invention is more particularly described in the following exemplary aspects that are intended as illustrative only since numerous modifications and variations therein will be apparent to those skilled in the art. The exemplary aspects are now described with reference to the figures, in which like reference characters indicate like parts throughout the several views.

Before the present articles, compositions, devices, and/or methods are disclosed and described, it is to be understood that this invention is not limited to the specific articles, devices, and/or methods disclosed unless otherwise specified, as such may, of course, vary. It is also to be understood that the terminology used herein is for the purpose of describing particular aspects only and is not intended to be limiting.

As used herein, the singular forms "a," "an" and "the" include plural referents unless the context clearly dictates otherwise. Thus, for example, reference to "a record" includes aspects having two or more such records unless the context clearly indicates otherwise.

The present invention relates to a selectively attachable wheel cover 10 for a motor vehicle. In its most basic form, the invention comprises a base member 100, a shaft member 400, and a display member 300. The base member 100 is secured to the rim 30 of a motor vehicle. Many aspects and fashions of securing the base member will be presented herein. The shaft member 400 is attached to a portion of the base member 100. When the base member is attached to a rim 30, the shaft member extends substantially transverse from the rim and substantially co-linearly with the longitudinal axis of the axle of the vehicle. The display member 300 is connected to the shaft member such that it can rotate in relation to the base member and, thus, the rim. A portion of the display member is sufficiently weighted such that, when the rim rotates (i.e., when the vehicle is in motion) the display member 300 remains substantially static. Therefore, should a graphic design 320 be imprinted or otherwise appear on the display surface 330 of the display member 300, it would be readily viewed by a person exterior to the vehicle, whether the vehicle were in motion or not. In most instances, the display member is substantially disc shaped. However, many other shapes are contemplated.

In one aspect, the base member has a front face 110, a back face 120, and a plurality of strap attachment points 150. The base member also has at least one strap in communication with at least one of the plurality of strap attachment points 150. This strap may be manufactured from a variety of materials, including, but not limited to, nylon, cotton, twine, etc. In this aspect, the straps engages at least a portion of the rim 30 of the motor vehicle, thereby substantially mounting the base member 100 to a portion of the rim. The straps may contain releasable buckles (not shown) in order to facilitate the easy installation and de-installation of the base member with respect to the rim 30. It is contemplated, however, that many conventional attachment assemblies may be used. Non-limiting examples of such assemblies include bungy cords, rope, string, etc. This type of attachment may be used, for example, with rims that have spoke-type rims or caps. The straps 152 may each wrap around one or more spokes and be reattached to themselves using any conventional means. In one aspect, a self-tightening buckle may be used, such as used in common back packs, luggage racks, and the like.

Figure 9:
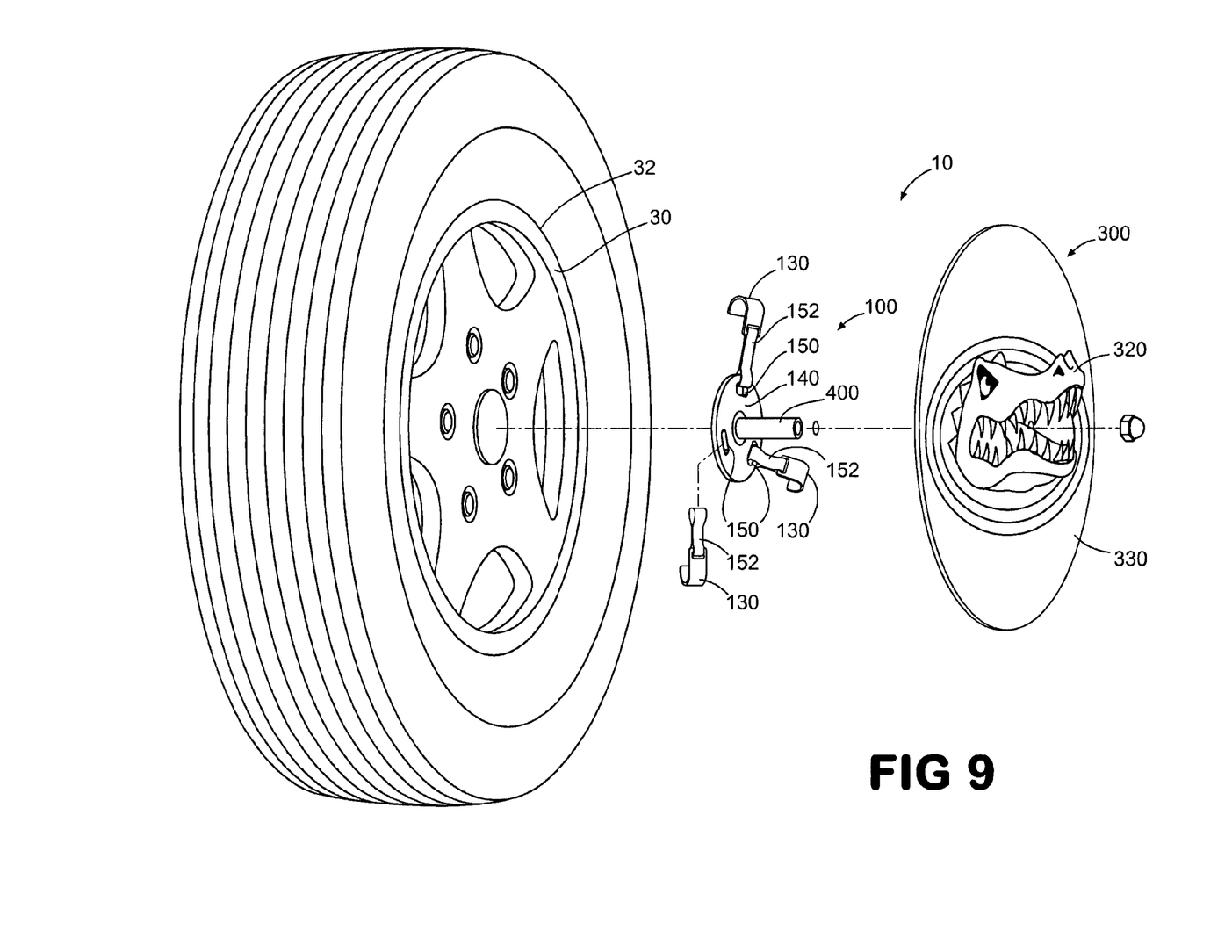
FIG. 9 is a partially exploded perspective view of the wheel cover comprising a base member with a plurality of strap attachment points in communication with a plurality of straps.

In yet another aspect, as illustrated in FIG. 9, the straps 152 are in communication with at least one strap attachment point and also attached to a mounting device 130. The mounting device 130 may be a clamp, a hook, or any other conventional mounting mechanism. Here, the mounting device engages at least a portion of a rim of the motor vehicle, thereby substantially mounting the base member 100 to a portion of the rim. This variety of attachment may be used, for example, with rims having a plurality of vent holes thereon the rim 30 or hub cap, substantially near the periphery of the rim 30 or hub cap. The vent holes provide an ample surface to attach the mounting device(s).

In other aspects, as in FIGS. 1-8, the base member 100 comprises a body member 140 having and a plurality of arm members 180 extending substantially radially therefrom. The distal ends 182 of the arm members are sized and shaped to engage an outermost portion 32 of a rim 30 of a motor vehicle. In one aspect, the arm members 180 are capable of extending and retracting such that the base member may be attached to rims of various diameters.

Figure 4:
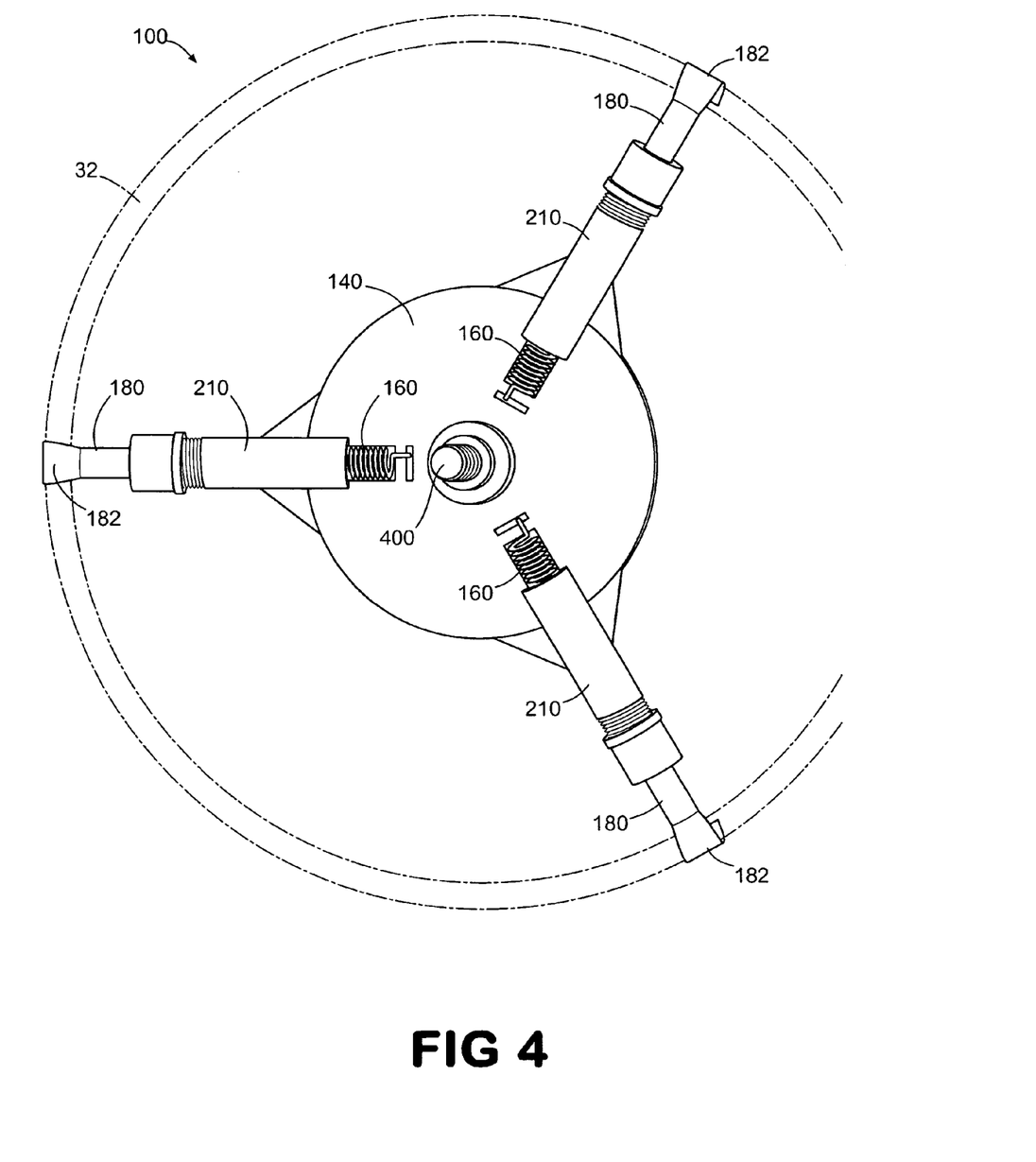
FIG. 4 is a front perspective view of one embodiment of the base member of the wheel cover of FIG. 1 having a body member with a plurality of arm members extending substantially radially therefrom and comprising a plurality of bias elements.
Figure 5:
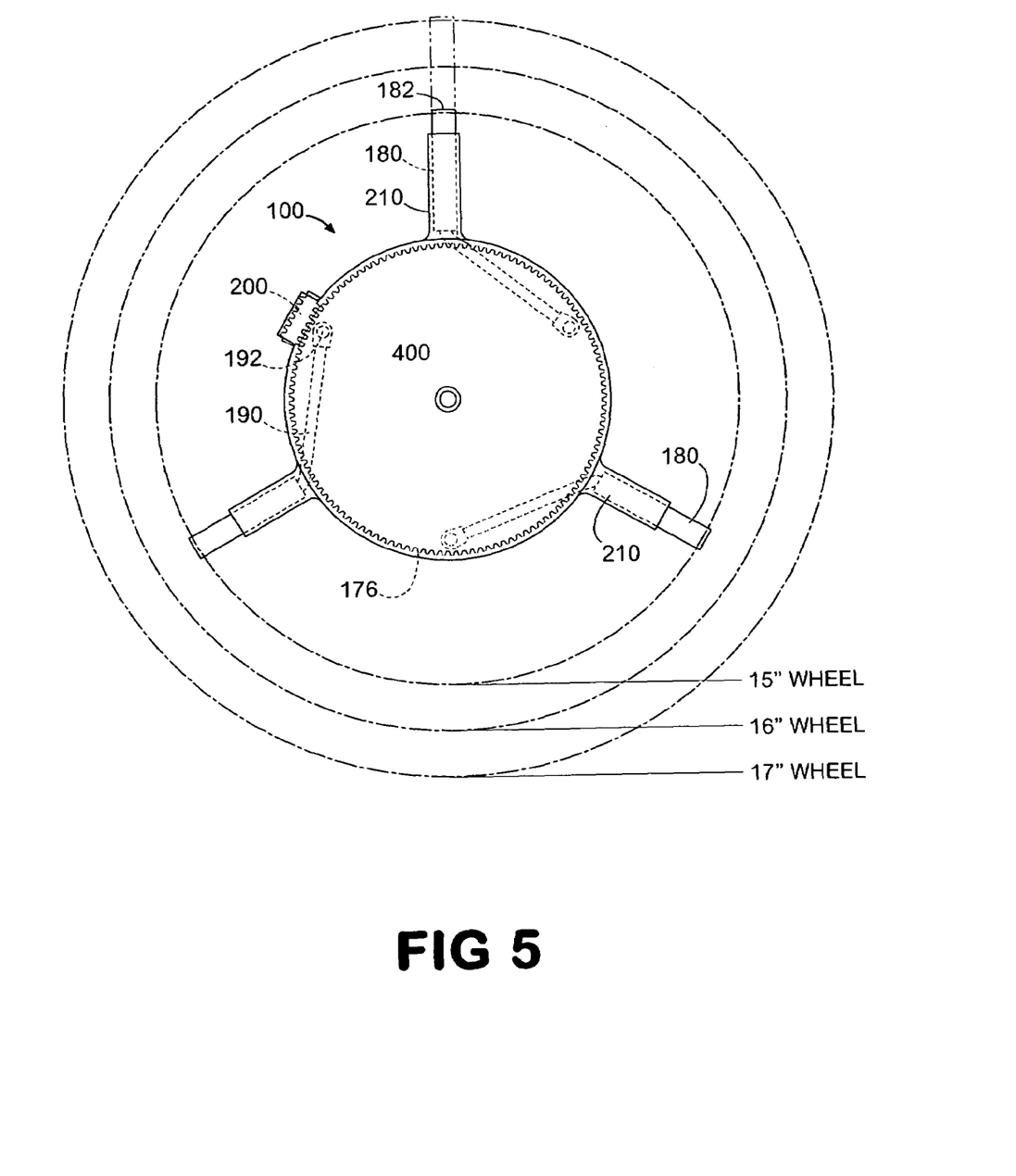
FIG. 5 is an elevational view of the base member of FIG. 2 illustrating that the base member may be attached to rims of various sizes.

There are several ways in which to accomplish having the arm members 180 extend and retract. One example, and not meant to be limiting, is to incorporate the use of a bias device 160, such as a spring, as can be seen in FIG. 4. The tension on the spring should be sufficient to securely attach the base member. Other examples may include the use of bungy cords, spring steel, or other retractable material.

Figure 1:
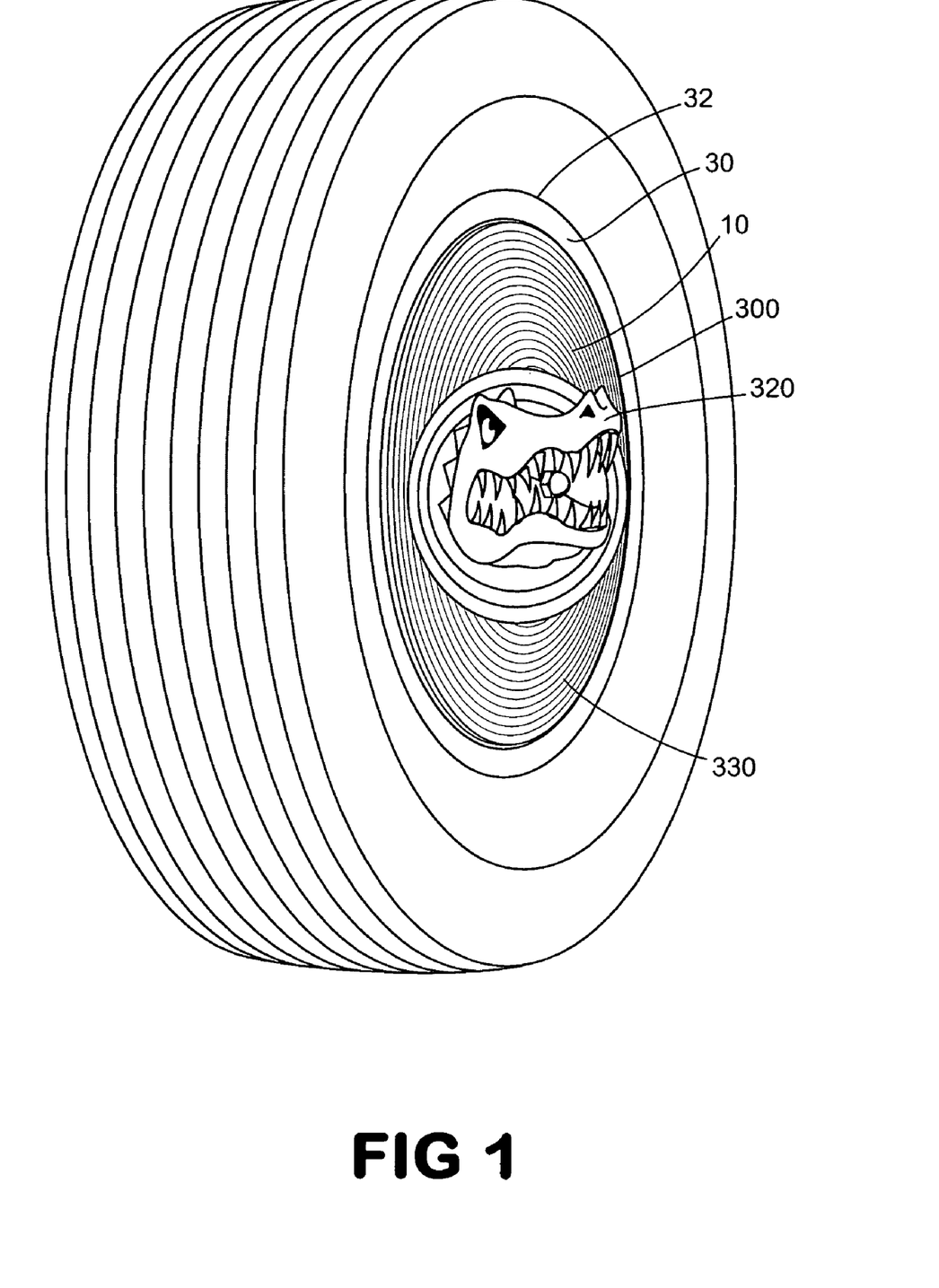
FIG. 1 is a perspective view of one aspect of the present invention for a wheel cover which is installed onto a rim of a vehicle.
Figure 2:
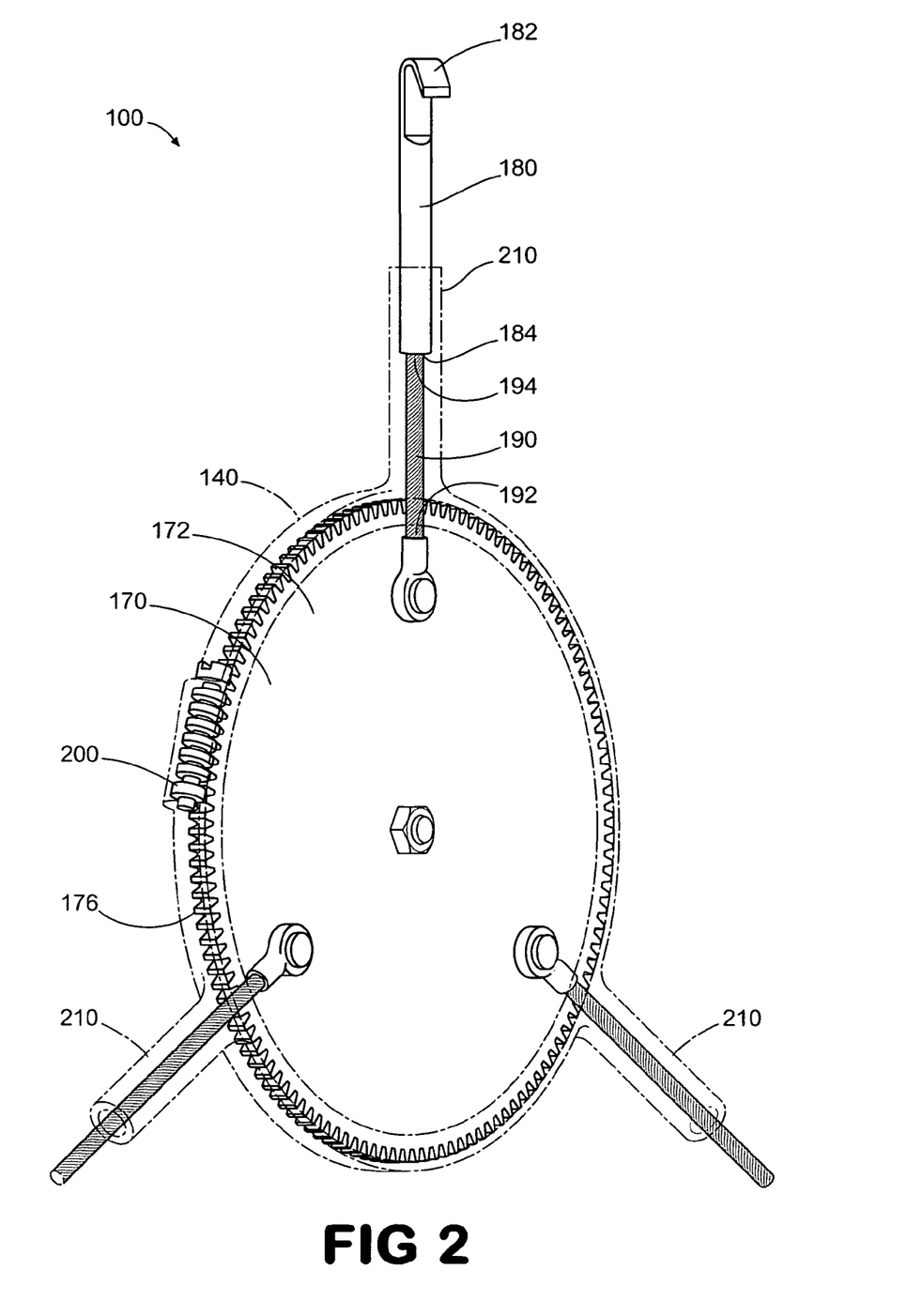
FIG. 2 is a partial cut away rear perspective view of one embodiment of the base member of the wheel cover of FIG. 1 having an inner disc member, a body member, a plurality of arm members, a plurality of cable members, and a screw member.
Figure 3:
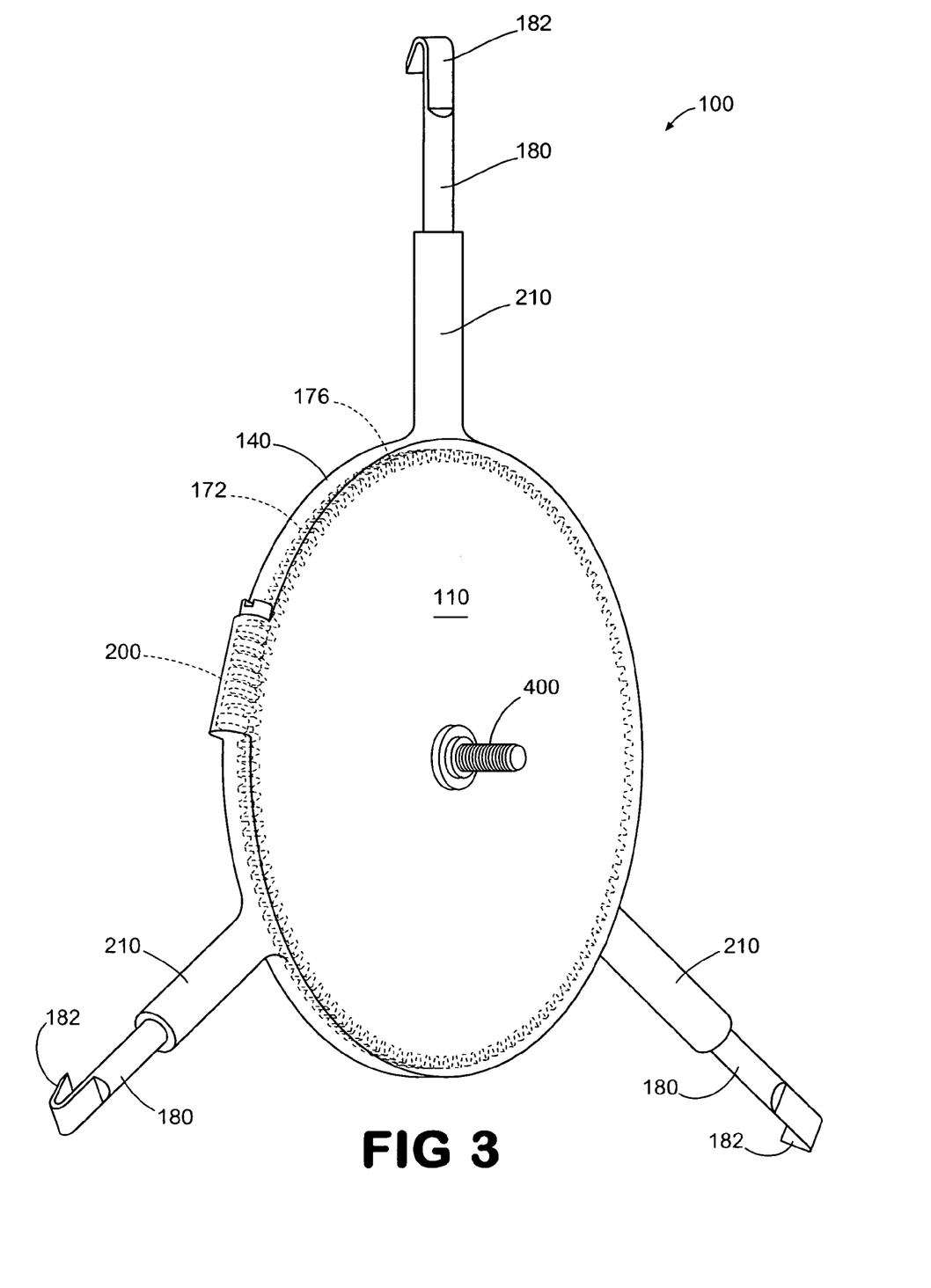
FIG. 3 is a partial cut away front perspective view of the base member of FIG. 2 also showing the shaft member.

In yet another aspect, the base member 100 comprises an inner disc member 170, a body member 140, a plurality of arm members 180, a plurality of cable members 190, and a screw member 200. In this aspect, the peripheral edge 172 of the inner disc member 170 comprises a toothed surface 176.

In this aspect, the body member 140 substantially houses the inner disc member 170 and further comprises a plurality of radially extending tubular members 210. The arm members 180 are slidably disposed therein the tubular members 210 and the distal ends 182 of each of the arm members 180 are sized and shaped to engage an outermost portion 32 of the rim 30 of the motor vehicle. In essence, they are equipped with hooks, clasps, or other conventional attachment devices.

In this aspect, the first end 192 of each of the cable members 190 is affixed to a portion of the back side 174 of the inner disc member 170. The second end 194 is affixed to the proximal end 184 of the arm member (the end that isn't engaged with the rim of the vehicle).

The screw member 200 described above is disposed thereon a circumferential surface 142 of the body member. In one aspect, it is sized and shaped to engage the toothed surface of the inner disc member such that it acts like a worm gear. In this aspect, rotation of the screw member 200 in a first direction rotates the inner disc member, pulling the cable members 190 therethrough the tubular members 210 and retracting the arm members. This action tightens the base member onto the rim 30. In one aspect, the cable members are pulled therethrough the tubular members at the same rate, thereby self-centering the base member on the rim.

Conversely, rotation of the screw member in a second direction rotates the inner disc member 170 in an opposite direction, loosening the cable members 190 and enabling the arm members 180 to be loosened, or extended. Thus, by having the arm members with the capability of extending and retracting, the base member may be installed on rims of varying diameters.

Figure 8:
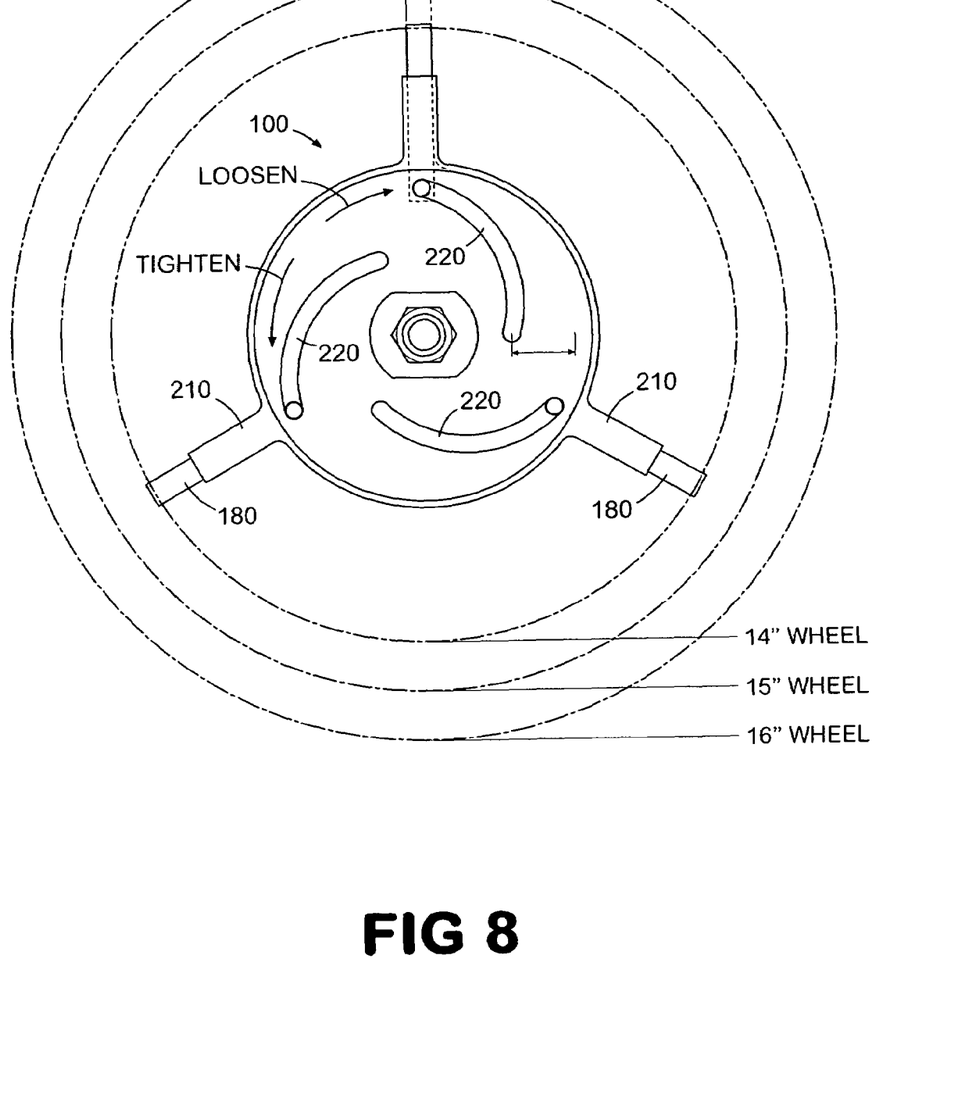
FIG. 8 is front elevational view of the display member of the wheel cover of FIG. 1, showing an inner disc member comprising a plurality of cam surfaces.

In still another aspect, as illustrated in FIG. 8, the base member comprises an inner disc member 170, a body member 140, a plurality of arm members 180, and plurality of cable members 190. In this aspect, the inner disc member 170 comprises a plurality of cam surfaces 220.

Similar to the previous aspect, the body member substantially houses the inner disc member and further comprises a plurality of radially extending tubular members 210. The arm members are slidably disposed therein the tubular members and the distal ends 182 of each of the arm members are sized and shaped to engage an outermost portion 32 of a rim 30 of a motor vehicle. As mentioned above, they are equipped with hooks, clasps, or the like.

In this aspect, the first end 192 of each of the cable members is slidably engaged with a cam surface 220 of the inner disc member 170. The second end 194 is affixed to the proximal end 184 of the arm member (the end that isn't engaged with the rim of the vehicle). When the user rotates the inner disk in a first direction, the camming action of the cam surface 220 against the ends of the cable members pulls the cable members 190 therethrough the tubular members and retracts the arm members 180. This action tightens the base member 100 onto the rim. Conversely, rotation of the inner disc member in a second direction loosens the cable members and enables the arm members to be loosened, or extended. As mentioned above, by having the arm members with the capability of extending and retracting, the base member may be installed on rims of varying diameters. In one aspect, the cable members are pulled therethrough the tubular members at the same rate, thereby self-centering the base member on the rim.

Figure 10:
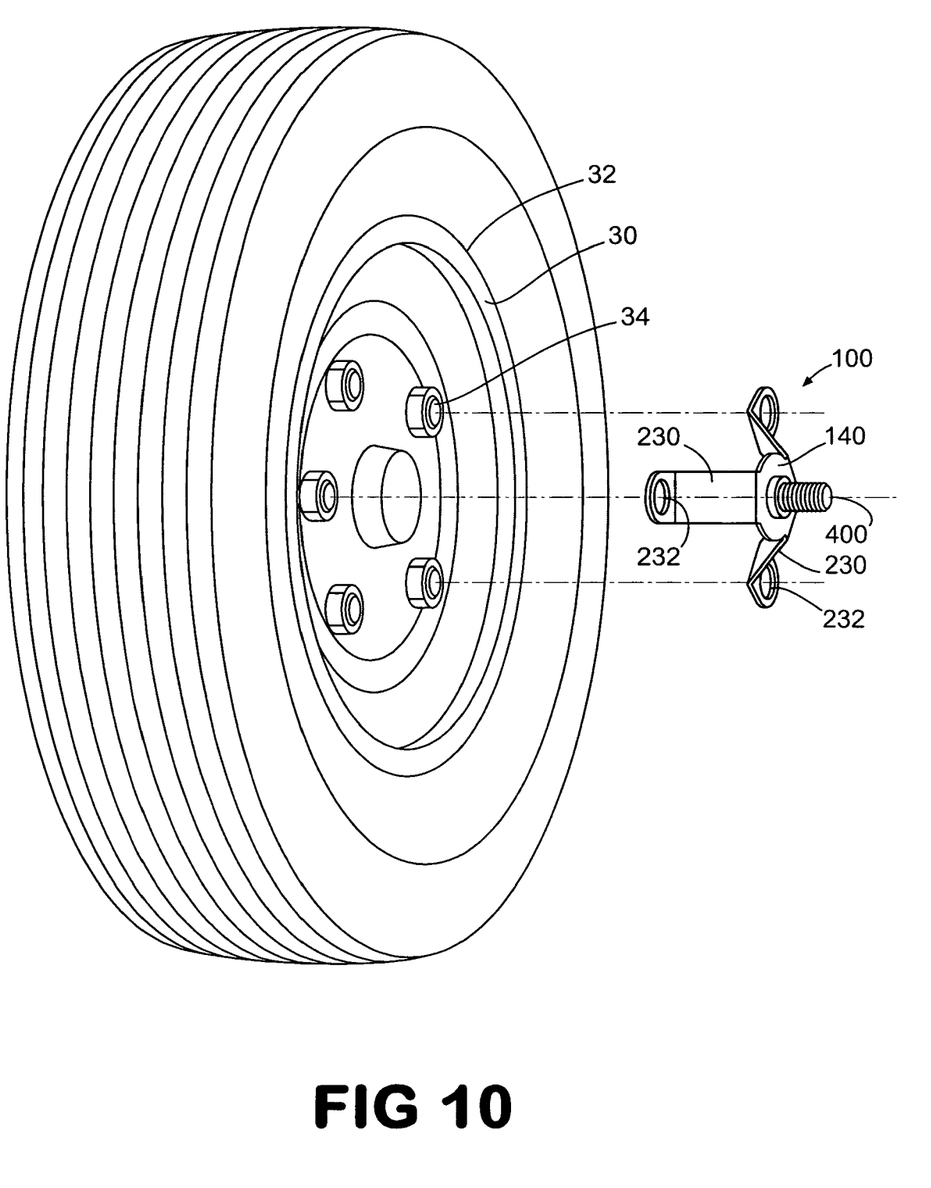
FIG. 10 is a perspective view of the base member that comprises a body member with a plurality of bracket members.

In yet another aspect, as is illustrated in FIG. 10, the base member comprises a body member 140 that has a plurality of bracket members 230. The bracket members 230 extend substantially therefrom the peripheral edge 144 of the body member. In this aspect, at least two bracket members comprise distal ends 232 constructed and arranged to engage the threaded lug shafts 34 of the extending therethrough the rim of the motor vehicle. Where the above described aspects may be attached to virtually any rim 30, this aspect is primarily designed for rims without ornate rims or hub caps, such as commercial vehicles.

It has been contemplated that the base member, in any aspect, may be manufactured with a variety of materials. Non-limiting examples would include aluminum, plastic, steel, rubber, composite, ceramic, and wood. Similarly, the display member 300 may be manufactured with a variety of materials, such as plastic, rubber, aluminum, etc.

In one aspect, the base member 100 is circularly shaped. However, it may be practically any shape, such as, but not limited to, triangular or square.

Moving on to the shaft member 400, in one aspect, the shaft member 400 is rotably mounted substantially near its proximal end to the base member and it extends substantially perpendicularly therefrom. In this aspect, the distal end of the shaft member 400 may have a threaded surface, wherein the display member is secured using a common bolt with or without a washer. It is contemplated, however, that any conventional means for securing the display member to the shaft member may be used.

In this aspect, the shaft member has a keyed end portion (not shown) at its distal end. Here, the center 340 of the display member defines a bore 350 shaped to engage the keyed end portion of the distal end 410 of the shaft member. That way, the display member does not rotate with respect to the shaft member 400; it remains substantially constant, while the base member is free to rotate with respect to the shaft member 400 and the display member. As one in the art will appreciate, in order to maintain contact between the display member and the shaft member, the distal end of the shaft member may have a bore through which the user may engage a cotter pin or other attachment device.

In one example, the shaft member 400 is rotably mounted to the base member using a roller bearing apparatus. However, any type of conventional bearing system will work. In fact, the base member 100 may define a bore through which the shaft member may engage the base member, and with sufficient lubrication, the base member would be rotably mounted without the need for a bearing system at all.

In another embodiment of the invention, as illustrated in FIGS. 2-5, and 8-10, the shaft member is mounted to the base member in substantially a fixed relationship with the base member 100. Here, the display member is rotably mountable substantially to the distal end of the shaft member. In this aspect, as one can appreciate, the base member still rotates with respect to the display member (which remains substantially static), however, the shaft member 400 also rotates with respect to the display member.

In one aspect of this embodiment, substantially the center 340 of the display member defines a bore 350 shaped to engage the distal end 410 of the shaft member 400. In another aspect, the display member is rotably mountable to the shaft member using a roller bearing 360 apparatus. As mention above, any type of conventional bearing system will work. Similarly, the display member may engage the shaft member without a bearing system, and with sufficient lubrication, the display member would be rotatable around the shaft member.

The shaft member may comprise any material sufficiently strong to withstand tangential forces applied thereon by the weight of the display member and wind resistance. Some examples may be steel, iron, aluminum, plastic, or any other rigid substance known in the art.

Figure 6:
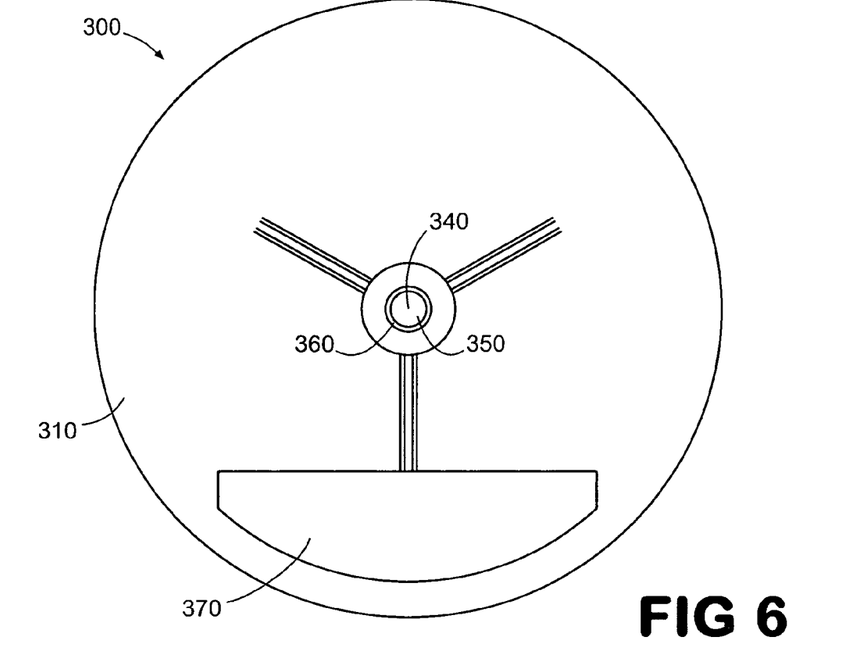
FIG. 6 is a rear elevational view of the display member of the wheel cover of FIG. 1, showing a mass attached substantially on a lower portion of the display member.

As stated above, the display member also comprises a weight assembly 370 substantially thereon a portion of the display member, such as, for example, its lower half. There are countless ways to weight the display member. A non-limiting example would include embedding a substance within the disc itself, such as, but not limited to, steel, concrete, lead, or any other sufficiently heavy material.

Figure 7:
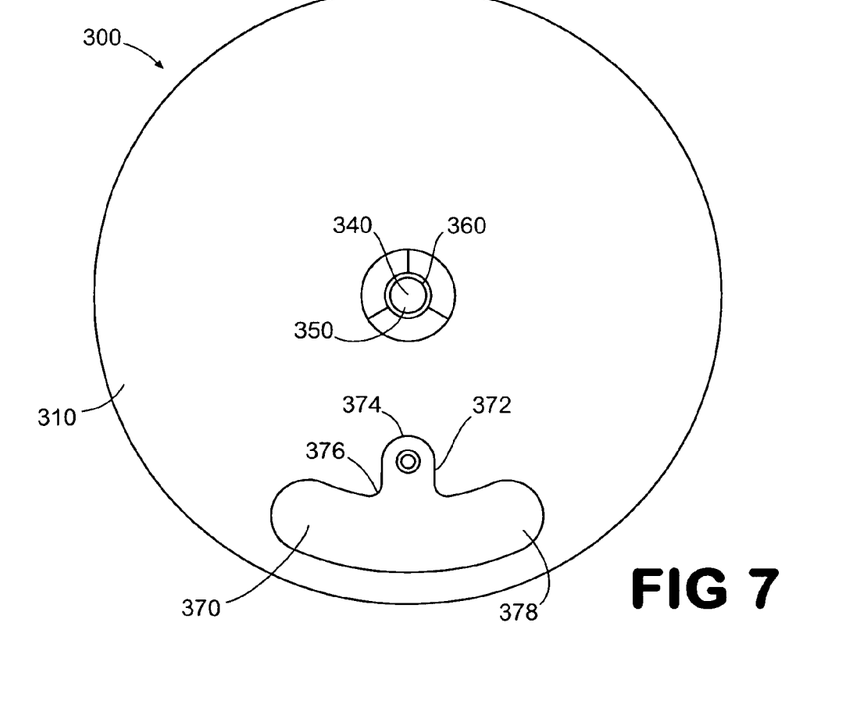
FIG. 7 is a rear elevational view of the display member of the wheel cover of FIG. 1, showing a mass rotationally attached to a pivot pin.

In another aspect, the display member also has a pivot pin mounted substantially on the lower half of the display member. In this aspect, the weight assembly 370 is attached to the pivot pin. Thus, the weight can move freely with respect to the disc. Inherently, this provides a dampening effect for the motion of the disc.

In one aspect, the weight assembly 370 has an elongate body 372 with a proximal end 374 and a distal end 376. Here, the proximal end 374 is rotably mounted to the pivot pin. In this aspect, a mass 378 is attached to the distal end 376 of the body at a distance from the pivot pin. Again, the oscillation of the disc caused by the acceleration and deceleration of the vehicle is substantially reduced.

In use, the base member, with the shaft member, will be mounted to the rim 30 or hub cap of the rim using the aforementioned methods. After the base member is secured, the display member is mounted thereon the shaft member.

Although several aspects of the invention have been disclosed in the foregoing specification, it is understood by those skilled in the art that many modifications and other aspects of the invention will come to mind to which the invention pertains, having the benefit of the teaching presented in the foregoing description and associated drawings. It is thus understood that the invention is not limited to the specific aspects disclosed hereinabove, and that many modifications and other aspects are intended to be included within the scope of the appended claims. Moreover, although specific terms are employed herein, as well as in the claims which follow, they are used only in a generic and descriptive sense, and not for the purposes of limiting the described invention.

We claim:

1. A selectively attachable wheel cover for a motor vehicle, comprising:
    a base member comprising:
        an inner disc member having a peripheral edge, wherein at least a portion of the peripheral edge comprises a toothed surface;
        a body member having a front face and substantially housing the inner disc member, the body member further comprising a plurality of radially extending tubular members;
        a plurality of arm members slidably disposed therein the tubular members, the arm members each having a proximal end, and a distal end, wherein the distal ends of the arm members are sized and shaped to engage an outermost portion of a rim of a motor vehicle;
        a plurality of cable members, each having a first end and a second end, wherein the first end is affixed to a portion of a back side of the inner disc member and the second end is affixed to the proximal end of the arm member; and
        a screw member disposed thereon a circumferential surface of the body member, wherein the screw member is sized and shaped to engage the toothed surface of the inner disc member and wherein rotation of the screw member in a first direction, in turn, rotates the inner disc member, which pulls the cable members therethrough the tubular members, retracting the arm members; and wherein rotation of the screw member in a second direction rotates the inner disc member in a an opposite direction, loosening the cable members and enabling the arm members to be extended;
    a shaft member having a distal end, the shaft member being connected to a center portion of the body member, extending substantially axially therefrom the front face of the body member; and
    a display member having a center, a lower half, and a display surface, the display member being rotably mountable substantially to the distal end of the shaft member, wherein the display member comprises a weight assembly mounted thereto substantially its lower half such that, when mounted thereon the distal end of the shaft member, the orientation of the display surface of the display member remains substantially stationary whether the rim of the vehicle is rotating or not.

2. A base member for attaching a wheel cover, the base member comprising:
- an inner disc member having a peripheral edge, wherein at least a portion of the peripheral edge comprises a toothed surface;
- a body member having a front face and substantially housing the inner disc member, the body member further comprising a plurality of radially extending tubular members;
- a plurality of arm members slidably disposed therein the tubular members, the arm members each having a proximal end, and a distal end, wherein the distal ends of the arm members are sized and shaped to engage an outermost portion of a rim of a motor vehicle;
- a plurality of cable members, each having a first end and a second end, wherein the first end is affixed to a portion of a back side of the inner disc member and the second end is affixed to the proximal end of the arm member;
- a screw member disposed thereon a circumferential surface of the body member, wherein the screw member is sized and shaped to engage the toothed surface of the inner disc member and wherein rotation of the screw member in a first direction, in turn, rotates the inner disc member, which pulls the cable members therethrough the tubular members, retracting the arm members; and wherein rotation of the screw member in a second direction rotates the inner disc member in a an opposite direction, loosening the cable members and enabling the arm members to be extended; and
- a shaft member having a distal end, the shaft member being connected to a center portion of the body member, extending substantially axially therefrom the front face of the body member.

* * * * *